United States Patent [19]

Milne

[11] Patent Number: 4,947,785

[45] Date of Patent: Aug. 14, 1990

[54] IMPROVEMENTS IN OR RELATING TO BOAT HULLS

[75] Inventor: Alexander Milne, Newcastle-upon-Tyne, United Kingdom

[73] Assignee: International Paint public limited Company, United Kingdom

[21] Appl. No.: 290,989

[22] Filed: Dec. 28, 1988

[51] Int. Cl.$^5$ .............................................. B63B 5/24
[52] U.S. Cl. .................................... 114/357; 128/907
[58] Field of Search ....................... 114/355, 357, 343; 428/446, 447, 905, 907; 425/238; 427/258, 408, 409, 412.1, 407.1, 403.2, 413, 384, 385.5, 387, 393.5; 156/245, 153, 154; 523/515, 516; 264/338, 129, 134, 135

[56] References Cited

U.S. PATENT DOCUMENTS 3,219,505 11/1965 Hilding .................................. 428/907
3,971,084 7/1976 Spier .................................... 114/357
4,099,280 7/1978 Hoppe .................................. 114/357
4,120,749 10/1978 Humphrey ........................... 114/357
4,624,679 11/1986 McEntee ............................... 428/907

Primary Examiner—Joseph F. Peters, Jr.
Assistant Examiner—Clifford T. Bartz
Attorney, Agent, or Firm—Eckert Seamans Cherin & Mellot

[57] ABSTRACT

A boat hull or part thereof produced by applying layers of curable resin to a mould or former and curing the resin in the mould or on the former. A layer of a non-biocidal antifouling material is applied to the mould, or to the outermost layer of resin if using a former, so that the non-biocidal antifouling material forms the outermost layer of the boat hull. A non-biocidal antifouling material used as the outermost underwater surface of a boat hull has fine grooves extending in the longitudinal direction of the hull. The grooves can be formed by applying the non-biocidal antifouling material to a grooved mould when using the process described above. Alternatively the underwater surface of a boat hull can be clad with a grooved non-biocidal antifouling material.

19 Claims, 1 Drawing Sheet

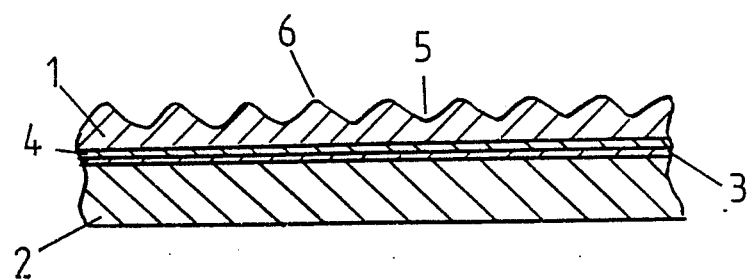

IMPROVEMENTS IN OR RELATING TO BOAT HULLS

This invention relates to boat hulls, to their production and to cladding for such hulls. In particular, it relates to the underwater surface of boat hulls, by which we mean those parts of ships, smaller boats, submarines, hydrofoils, sailboards or other water craft which are under water in use, and to materials for use at the underwater surface which resist fouling by settlement of marine organisms such as barnacles and algae.

BACKGROUND TO THE INVENTION

The outer surface of a boat hull needs to resist fouling. Fouling has conventionally been inhibited by antifouling paints containing a biocide for marine organisms, which biocide is gradually leached from the paint. More recently, antifouling paints based on a hydrolysable copolymer, such as a triorganotin copolymer, have been used; in these paints the paint film is gradually dissolved from the surface of the hull as the boat moves through the sea water. However, there has recently been concern about the environmental effect of biocides released by leaching or hydrolysis from such paints, particularly from yachts and pleasure boats which are moored near the shore. There have been proposals for non-biocidal antifouling materials which do not release a poison for marine organisms but which resist the adhesions of marine fouling organisms. For example British Patents 1307001, 1470465 and 1581727, U.S. Pat. No. 3702778 and European Patents 16195 and 32597 and UK Patent Application 2141436 suggest the use of a silicone rubber, especially a room-temperature-vulcanised silicone rubber, on marine surfaces to prevent fouling. There are, however, difficulties in applying a room-temperature-vulcanisable silicone rubber to a boat hull because the silicone rubber has very low adhesion to materials used for boat construction. Such silicone rubber antifoulings have been used to a small extent on static marine structures but have not been used commercially on ships' hulls. French Patent 2157074 suggests the use of fluorinated resins as non-biocidal antifoulings.

Many boat hulls are made by applying layers of a curable resin, particularly a fibre-reinforced resin, to a mould and curing the resin the mould. The mould is usually a female mould, that is to say the layers of resin are applied inside the mould so that the layer first applied to the mould becomes the outermost layer of the boat hull. The boat hull may be made in one piece or in parts, particularly halves, which are then secured together. The mould is itself generally formed from glass-fibre-reinforced polyester resin. In an alternative procedure the boat hull or part thereof can be made by applying layers of resin to a former or male mould and curing them in the mould so that the last applied layer forms the outermost layer of the boat hull.

Swedish Patent Application 8001826 relates to a moulding technique for boat hulls in which the mould release agent, which contains an antifouling agent and may be a mixture of a fluorocarbon polymer and an antifouling agent, is transferred to the moulded boat hull. British Patents 1600120 and 2084488 and European Patent 46354 describe applying a mixture of copper particles and a suitable resin to the mould face when moulding a boat hull or other underwater structure.

U.S. Defensive patent publication No. 686959 describes a technique of viscous drag reduction of aircraft by forming fine grooves or "riblets" parallel to the airflow over the aircraft surface. It suggests that the technique can be applied to a boat hull.

SUMMARY OF THE INVENTION

A process according to the invention for the production of a boat hull or part thereof comprises applying layers of curable resin to a mould and curing the resin in the mould and is characterised in that a layer of a non-biocidal antifouling material is applied to the mould so that it forms the outermost layer of the boat hull.

An alternative process according to the invention for the production of a boat hull or part thereof comprises applying layers of curable resin to a former and curing the resin on the former and is characterised in that a layer of a non-biocidal antifouling material is applied to the outermost layer of resin on the former before the resin has been fully cured so that the non-biocidal antifouling material forms the outermost layer of the boat hull.

According to another aspect of the invention a boat whose underwater hull has its outermost surface formed of a non-biocidal antifouling material is characterised in that at least part of the non-biocidal antifouling material has fine grooves extending in the longitudinal direction of the hull, the grooves having widths of 10 to 500 microns and depths of 5 to 100 microns. By the longitudinal direction of the hull we mean the normal forward direction of travel of the ship under way.

In an antifouling cladding according to the invention for a boat's underwater hull or part thereof, the surface of the cladding intended to form the outer surface of the clad hull comprises a non-biocidal antifouling material having fine grooves extending in the longitudinal direction of the hull, the grooves having widths of 10 to 500 microns and depths of 5 to 100 microns.

We have found that conventional antifouling points become rough and pitted in use due to the leaching out of the biocide contained in the paint and that hydrolysing copolymer paints tend to remove any peaks such as riblets on the paint surface in service by preferential dissolving of the copolymer peaks. The surface of the hull must resist fouling, because large-scale fouling by marine organisms causes a substantial increase in drag and even small-scale fouling such as algae slime can remove any benefit to be gained from the finely grooved surface. The non-biocidal antifouling hull surface of the present invention retains the drag reduction given by grooves or riblets over long periods of use in the water.

BRIEF DESCRIPTION OF THE DRAWING

The FIGURE is a fragmented sectional view of a boat hull constructed in accordance with the invention.

DETAILED DESCRIPTION

The preferred non-biocidal antifouling material as shown in the FIGURE is a silicone rubber, most preferably a room-temperature-vulcanised silicone rubber. Such silicone rubbers have superior antifouling properties compared to fluorinated resins and hydrogels, which may also be used as non-biocidal antifouling materials.

As depicted in the FIGURE, the grooved non-biocidal antifouling material 1 is attached to a boat hull 2 by adhesive layer 3 and tie coat 4. The grooves in the antifouling material 1, which is preferably a moulded silicone rubber antifouling material, are in the form of rounded channels 5 with cusps 6 between them.

The room-temperature-vulcanisable silicone rubber is preferably an organopolysiloxane having hydroxy end groups. Alternative curable organopolysiloxanes, which can be used a single-pack systems, are acyloxy- or alkoxy-tipped. The silicone rubber composition generally includes an alkoxysilane and is cured using a tin catalyst such as dibutyltin dilaurate, dibutyltin diacetate or stannous octoate. Examples of such silicone rubbers are those sold by Dow Corning as RTV 3110 and by ICI as Silicoset 105. These silicone rubbers are generally sold containing silica filler but a clear, filler-free silicone rubber composition is preferred to give the best antifouling effect. The organic groups present in the siloxane units of the silicone rubber may be all alkyl groups, for example methyl groups, or may include both alkyl and aryl, for example phenyl, groups. The silicone rubber can contain silicon-free polymeric segments as described in European Patent 32597, incorporated herein by reference. The silicone rubber composition may contain a non-reactive fluid which enhances its resistance to fouling, for example a silicone oil as described in British Patent 1470465 or a hydrocarbon compound as described in British Patent 1581727 or UK Patent Application 2141436, all incorporated herein by reference. The silicone oil preferably has a viscosity of 20–1000 mPa s, generally equivalent to a molecular weight of 2,000 to 30,000. It may be a polydialkylsiloxane, for example a polydimethylsiloxane, but it preferably contains aryl groups, for example phenyl groups, as well as alkyl groups. One example of a preferred methyl phenyl silicone oil is that sold by Dow Corning as DC 550. Examples of fluid hydrocarbon compounds are lubricating oils such as technical white oil, low molecular weight polybutene, liquid paraffin, petrolatum or a liquid paraffin/petrolatum mixture. The non-reactive fluid is preferably used at 1 to 50 percent by weight based on the silicone rubber, most preferably 5–20 percent.

Examples of fluorinated resins suggested as non-biocidal antifoulings are polytetrafluoroethylene, fluorinated ethylene/propylene copolymers, perfluoroalkyl vinyl ether polymers, ethylene/chlorotrifluoroethylene copolymers and polyvinylidene fluoride. Fluoropolymers grafted with acrylic chains or silicones grafted with fluoropolymers may also be effective. Hydrogels, such as those based on hydroxyalkyl acrylate and methacrylate polymers described in British Patent 1403388 or those based on polyethyleneglycol described in British Patent 1409048, both incorporated herein by reference, may be effective as non-biocidal antifoulings.

Alternative materials which may be effective include polymers having a high concentration of hydrophilic groups at the surface, for example strong anionic groups such as sulphonate, sulphate, phosphonate or phosphate groups. The resistance to fouling of membranes of sulphonate polymers is described by Gregor and Gregor in "Scientific American", vol. 239, part 1 (1978) at page 93. The polymer containing hydrophilic groups should be sufficiently crosslinked that it is not soluble or erodible in sea water.

The non-biocidal antifouling material is preferably applied to form a layer thickness of up to 500 microns; the minimum thickness is that required to ensure a continuous film of the silicone rubber, generally 5 to 10 microns.

The non-biocidal antifouling material can be applied to the mould by any suitable means, for example spray, brush or roller. It may contain a thickening agent or structuring agent to allow the formation of a thick layer in the mould without sagging. It may be pigmented, but is preferably clear to reveal the colour of the layer of resin which is next applied and thus underlies it in the finished hull.

The mould may be coated with a mould-release agent before applying the non-biocidal antifouling material, but for many such materials, for example room-temperature-vulcanisable silicone rubber, this is not necessary because the silicone rubber has low adhesion to the mould.

When the non-biocidal material is a room-temperature-vulcanised silicone rubber the layer of resin next applied to the mould is preferably a tie coat based on a silicone resin containing an adhesion promoter such as an aminosilane, for example that sold under the trade mark "Intersleek Tie Coat". This has good adhesion to theroom-temperature-vulcanisable silicone rubber and its adhesion to materials used in boat construction, although less than that of most paints, is better than that of the room-temperature-vulcanisable silicone rubber. The silicone resin tie coat is preferably pigmented, in particular with white or colouring pigments, to give the desired colour of the boat hull or it too may be clear to reveal the colour of the resin layer next applied and thus underlying it in the finished boat hull. The tie coat is preferably applied at a thickness of 5 to 50 microns. It is preferably applied to the silicone rubber before the silicone rubber has fully cured.

In an alternative method of applying the non-biocidal antifouling material, for example the room-temperature-vulcanisable silicone rubber layer, a fabric coated with the silicone rubber is applied to the mould with its silicone rubber surface in contact with the mould. The coated fabric can be formed by coating a fabric, for example a woven, knitted or nonwoven fabric, with silicone rubber, preferably using an intermediate tie coat of the type described above. The fabric is preferably a glass fibre fabric. The silicone rubber has a better adhesion to glass fabric than to other fabrics. A tie coat based on a silicone resin containing an aminosilane adhesion promoter has particularly good adhesion to glass fabric. If the silicone rubber layer is applied as a coated fabric the subsequently applied resin layers, for example unsaturated polyester layers, generally have good adhesion to the fabric surface.

The boat hull is preferably formed of at least one layer, preferably more than one layer, of fibre-reinforced resin. The preferred resin is unsaturated polyester resin as is widely used in boat building, for example a resin based on phthalic anhydride and an unsaturated dicarboxylic acid or anhydride such as maleic anhydride or fumaric acid together with suitable aliphatic diol(s). The fibrous reinforcement is preferably a chopped strand glass mat. The boat hull is preferably formed in a female mould so that the first applied layer forms in the outer layer of the boat hull; according to the invention this layer is of non-biocidal antifouling material. A layer of resin, for example unsaturated polyester resin, containing no fibrous reinforcement is preferably applied before the layers of fibre-reinforcement resin. The non-reinforced polyester is preferably based on isophthalic acid with an unsaturated dicarboxylic acid anhydride and aliphatic diol. When the preferred silicone resin tie coat is used the non-reinforced unsaturated polyester resin layer is preferably applied before the tie coat is fully cured. We have found that when such layers are allowed to cure in contact with each other in the mould they adhere well and have improved adhesion compared to the silicone resin tie coat applied to a cured boat hull of the same resin. Alternatively a layer of non-reinforced unsaturated polyester resin may be applied directly to the room-temperature-vulcanisable silicone rubber layer before it has fully cured; the adhesion between layers when cured is greater than when the room-temperature-vulcanisable silicone rubber is applied to a cured boat hull of the same resin.

The process of the present invention in which the non-biocidal antifouling material is applied to the mould can give advantages in antifouling performance compared to application of the same material as a coating, particularly for materials which are cured in the mould such as toom-temperature-vulcanisable silicone rubber. The silicone rubber curing in contact with the mould cannot pick up dust particles on its antifouling surface as it cures; such dust particles can detract from fouling resistance, which depends largely on resistance to adhesion by marine organisms.

For maximum resistance to fouling, the mould surface is preferably smooth to give a smooth surface of silicone rubber or other non-biocidal antifouling material on the hull. Alternatively, the mould surface can be finely grooved in the longitudinal direction of the boat hull so that the non-biocidal antifouling surface of the hull is also finely grooved. The grooves in the hull can for example have widths of 10 to 500 microns and depths of 5 to 100 microns. They can be V-shaped, or the mould can have parallel rounded protuberances with narrow grooves between them, producing a non-biocidal antifouling surface whose grooves are rounded channels with cusps between them. Such longitudinal grooves can reduce the drag on the hull as it moves through the water.

When the boat hull is formed on a male mould or former the layers of resin, preferably fibre-reinforced, are built up in known manner. A layer of resin, preferably unsaturated polyester resin, containing no fibrous reinforcement is preferably applied over the fibre-reinforced layers. When the non-biocidal antifouling material is room-temperature-vulcanised silicone rubber a tie coat based on silicone resin as described above is preferably used and is applied before the unsaturated polyester resin is cured, followed by a room-temperature-vulcanisable silicone rubber, which is preferably applied to the silicone resin tie coat before the tie coat has cured. Alternatively, the layer of room-temperature-vulcanisable silicone rubber or a fabric coated with such silicone rubber may be applied directly to the outermost unsaturated polyester layer before it has cured.

A polyester resin boat hull may incorporate a thin water-impervious metal layer outside the reinforced polyester resin to prevent blistering. Such a thin metal layer, for example a metal foil or a metallised plastics film, can be used in conjunction with but beneath the non-biocidal antifouling layer proposed by the present invention. The metal layer may for example be applied directly to a silicone-based tie coat before it is fully cured, or a resin composition having good adhesion to the metal, for example a non-reinforced unsaturated polyester resin or an adhesion-promoting epoxy resin coating, can be applied to the tie coat before the metal layer. Such a resin composition is preferably used if the metal layer is a metallised plastics film; alternatively in the latter case the film can be applied directly to the tie coat with its plastics surface containing the tie coat. The fibre-reinforced plastics layer(s) are then applied to the metal layer, optionally after application of an adhesion-promoting layer.

The boat hull or part thereof is cured in the mould or on the former under the conditions generally used for curing resin-based boat hulls. Ambient temperature curing of unsaturated polyester resins using peroxide initiators and promoters containing a transition metal, for example cobalt, is preferred.

A further coat of room-temperature-vulcanisable silicone rubber anti-fouling composition can optionally be applied to a hull after it has been formed. The room-temperature-vulcanisable silicone rubber adheres well to itself. The room-temperature-vulcanisable silicone rubber coating so applied may have the same composition as the layer applied in the mould but need not have; for example a boat hull whose outer moulded layer is of room-temperature-vulcanisable silicone rubber containing no silicone oil may be coated with a composition comprising a room-temperature-vulcanisable silicone rubber and a silicone oil, preferably a methyl phenyl silicone oil.

The grooved antifouling cladding of the invention can be moulded as a tape or sheet in a mould having a finely grooved surface designed to produced grooves of the desired configuration in the cladding. The grooves can be V-shaped or the mould can have parallel rounded protuberances with narrow grooves between them, producing a non-biocidal antifouling surface whose grooves are rounded channels with cusps between them. The grooves in the antifouling cladding sheet can alternatively be formed by embossing rolls. The thickness of the non-biocidal antifouling cladding is for example up to 1 mm, preferably up to 500 microns; the minimum thickness is that required to ensure a continuous film, for example having a thickness of 5 to 10 microns at the bottom of the grooves.

The use of an elastomeric non-biocidal antifouling material such as a silicone rubber has the further advantage that the riblets of silicone rubber between the grooves may be sufficiently compliant to the water flow over the grooved surface to enhance the drag reduction.

The antifouling cladding can be backed with a reinforcing flexible sheet material as described in European Patent 16195, incorporated herein by reference. The reinforcing material is preferably bonded to a tie coat for a room-temperature-vulcanised silicone rubber as described above. The reinforcing material can be a fabric, for example a woven fabric. The fabric is preferably a glass fibre fabric, which has particularly good adhesion to a tie coat based on a silicone resin containing amino silane adhesion promoter. Nylon or polyester fabric can alternatively be used. The reinforcing material can alternatively be a tough plastic film such as an oriented polyester or polypropylene film.

The cladding is fixed, preferably by adhesive, to all or part of the underwater surface of the hull. The adhesive can be a tie coat as described above for a silicone rubber cladding, or a further adhesive layer, for example an epoxy-based adhesive, can be applied to the tie coat. If a reinforcing backing sheet is used it is preferably coated with an adhesive such as an epoxy-based adhesive. A particular use of the invention is in the cladding of submarines. Submarines are frequently clad with plastic tiles to reduce the risk of detection by sonar. The tiles can be formed with their outermost surface of non-biocidal antifouling material such as room-temperature-vulcanised silicone rubber moulded to have fine grooves according to the invention.

What is claimed is:

1. A process for the production of a boat hull or part thereof, comprising applying a continuous layer 5 to 500 microns thick of a non-biocidal antifouling material which does not release a poison for marine organisms but which resists the adhesion of marine fouling organisms to a mould so that it forms a continuous outermost layer of the boat hull, applying layers of curable resin to the mould and curing the resin in the mould.

2. A process according to claim 1, in which the non-biocidal antifouling material is a room-temperature-vulcanisable silicone rubber.

3. A process according to claim 2, in which the layer of room-temperature-vulcanisable silicone rubber contains a non-reactive fluid selected from the group consisting of non-reactive polyorganosiloxanes and non-reactive hydrocarbon compounds.

4. A process according to claim 2, in which the layer of resin immediately adjacent to the layer of room-temperature-vulcanisable silicone rubber is a tie coat comprising a silicone resin and an aminosilane adhesion promoter.

5. A process according to claim 1, in which the layers of curable resin include at least one layer containing fibrous reinforcement, and the layer of resin immediately adjacent to the non-biocidal antifouling material is a layer of curable resin containing no fibrous reinforcement.

6. A process according to claim 1, in which the non-biocidal antifouling layer is applied to the mould in the form of a fabric coated with a room-temperature-vulcanisable silicone rubber.

7. A process according to claim 1, in which the mould surface is finely grooved in the longitudinal direction of the boat hull so that the non-biocidal antifouling surface of the boat hull is also finely grooved.

8. A process for the production of a boat hull or part thereof, comprising applying layers of curable resin to a former and curing the resin on the former, in which process a continuous layer 5 to 500 microns thick of a non-biocidal antifouling material which does not release a poison for marine organisms but which resists adhesion of marine fouling organisms is applied to the outermost layer of resin on the former before the resin has been fully cured so that the non-biocidal antifouling material forms a continuous outermost layer of the boat hull.

9. A process according to claim 8, in which the non-biocidal antifouling material is a room-temperature-vulcanisable silicone rubber.

10. A process according to claim 9, in which the layer of room-temperature-vulcanisable silicone rubber contains a non-reactive fluid selected from non-reactive polyorganosiloxanes and non-reactive hydrocarbon compounds.

11. A process according to claim 9, in which the layer of resin immediately adjacent to the layer of room-temperature-vulcanisable silicone rubber is a tie coat comprising a silicone resin and an aminosilane adhesion promoter.

12. A process according to claim 8, in which the layers of curable resin include at least one layer containing fibrous reinforcement and the layer of resin immediately adjacent to the non-biocidal antifouling material is a layer of curable resin containing no fibrous reinforcement.

13. A process according to claim 4, in which the layers of curable resin include at least one layer containing fibrous reinforcement, and the layer of resin immediately adjacent to the tie coat is a layer of curable resin containing no fibrous reinforcement.

14. A process according to claim 11, in which the layers of curable resin include at least one layer containing fibrous reinforcement and the layer of resin immediately adjacent to the tie coat is a layer of curable resin containing no fibrous reinforcement.

15. A boat whose underwater hull has its outermost surface formed of a continuous layer 5 to 500 microns thick of a non-biocidal antifouling material which does not release a poison for marine organisms but which resists the adhesion of marine fouling organisms, at least part of said non-biocidal antifouling material having fine grooves on its surface, said grooves extending in the longitudinal direction of the hull and having widths of 10 to 500 microns and depths or 5 to 100 microns.

16. A boat according to claim 15, in which the grooves are in the form of rounded channels with cusps between them.

17. A boat according to claim 15, in which the non-biocidal antifouling material is a room-temperature-vulcanised silicone rubber.

18. An antifouling cladding for a boat's underwater hull or part thereof, the surface of the cladding which is intended to form the outer surface of the clad hull comprising a continuous layer 5 to 500 microns thick of a non-biocidal antifouling material which does not release a poison for marine organisms but which resists the adhesion of marine fouling organisms, said non-biocidal antifouling material having fine grooves extending in the longitudinal direction of the hull, the grooves having widths of 10 to 500 microns and depths of 5 to 100 microns.

19. An antifouling cladding according to claim 18, in which the cladding is based with a reinforcing flexible sheet material.

* * * * *

UNITED STATES PATENT AND TRADEMARK OFFICE
CERTIFICATE OF CORRECTION

PATENT NO. : 4,947,785

DATED : August 14, 1990

INVENTOR(S) : Milne

It is certified that error appears in the above-identified patent and that said Letters Patent is hereby corrected as shown below:

Title page, insert the Foreign Application Priority Data:

```
Jan. 7, 1988 [UK] United Kingdom............88 00297
Jan. 7, 1988 [UK] United Kingdom............88 00298
```

Signed and Sealed this

Seventeenth Day of March, 1992

Attest:

HARRY F. MANBECK, JR.

*Attesting Officer*  *Commissioner of Patents and Trademarks*